United States Patent [19]

Broderick et al.

[11] 4,018,525
[45] Apr. 19, 1977

[54] INSTANT IMAGE FILM CAMERA WITH INSPECTION STATION

[75] Inventors: Milan A. Broderick, Riverwoods; Robert F. Porazinski; Eugene V. Mateja, both of Norridge, all of Ill.

[73] Assignee: Bell & Howell Company, Chicago, Ill.

[22] Filed: Mar. 31, 1975

[21] Appl. No.: 563,744

[52] U.S. Cl. .................................. 355/27; 355/45; 355/65; 355/77
[51] Int. Cl.² .................. G03B 27/32; G03B 27/52
[58] Field of Search .................. 355/27, 44, 45, 64, 355/65, 77

[56] References Cited

UNITED STATES PATENTS

| | | | |
|---|---|---|---|
| 2,784,653 | 3/1957 | Pierce et al. | 355/27 X |
| 2,856,829 | 10/1958 | Orlando | 355/27 X |
| 3,080,802 | 3/1963 | Friedel | 355/27 X |
| 3,196,765 | 7/1965 | Walkup | 355/44 X |
| 3,264,961 | 8/1966 | Tuttle et al. | 355/27 X |
| 3,509,807 | 5/1970 | Sutton et al. | 355/27 X |
| 3,585,917 | 6/1971 | Griffith | 355/27 X |

Primary Examiner—Richard A. Wintercorn
Attorney, Agent, or Firm—Robert A. Walsh

[57] ABSTRACT

A microfilm camera using an instant image film, such as a vesicular film, is herein disclosed. Instant developing stations and an associated read-out optical system are positioned in the path followed by the film as it travels through the camera. After the film is developed, its image is projected through the optical system onto a display screen. This way the operator may see the images immediately after they are formed on the film and rephotograph any defective image immediately.

8 Claims, 2 Drawing Figures

INSTANT IMAGE FILM CAMERA WITH INSPECTION STATION

This invention relates to microfilm cameras and more particularly to such cameras utilizing an instant image film, such as a vesicular film, with an inspection station for displaying the film image as it develops.

Vesicular film is one form of a well known instant image film or structure which produces an image when in the presence of an activation, here ultraviolet light. The principle is that a gas is generated in the film when the film is exposed to ultraviolet light. A document to be photocopied is illuminated by ultraviolet light which is reflected onto the film. Depending upon the image of the copied document some parts of the film receives much light and other parts receive little or no light. The image is formed by a release of gas where ultraviolet light strikes the film. The resulting image is thereafter developed when the film is subjected to heat. Unless set within a short time the gas merely escapes and the image fades and disappears. Hence, this type of film provides for instant development, whereby the image is available for viewing almost immediately after exposure.

Microfilm cameras are also well known devices which make it possible to reduce filing space requirements to a bare minimum. They photographically reproduce and preserve images, especially images of documents. Of course, the original document should be preserved until after the exposed and developed microfilm has been inspected and found satisfactory.

Heretofore, more time than was desirable was required to insure quality control in the operation of microfilm cameras. For example, a series of documents were photographed on conventional microfilm. Then, the microfilm was developed in a separate and time consuming process. Next, the developed film was inspected. If a defective image was found, it was necessary to seek out and find the original document and then to rephotograph it, which again is time consuming. Aside from the time required to locate and rephotograph the original, there is a problem of convenience since the defective copy is on the original microfilm reel, where it should be found, and the non-defective rephotographed copy is on another reel, where it is hard to find. Hence, even a time consuming recopying process could not avoid the awkward and difficult to use steps associated with microfilm systems of the past.

Suggestions have been made to use microfilm systems which incorporate self-developing film. However, these systems have not adequately satisfied the problems since it was still necessary to inspect the developed film at a later time and to rephotograph on another reel of film, as in the past.

Accordingly, an object of the invention is to provide new and improved microfilm systems. Here, an object is to provide microfilm systems with immediate viewing of self-developing film for quality control purposes. In particular, an object is to provide an automatic microfilm camera which continuously feeds developed copy through an inspection station.

Still another object of the invention is to provide a new and superior microfilm process. Here, an object is to enable better quality control through a use of instant image display. In this connection, an object is to provide a new and superior microfilm system which is easier to photocopy and easier to retrieve.

In keeping with an aspect of this invention, these and other objects are accomplished by providing a microfilm camera which uses an instant image film, such as a vesicular film, with instant developing stations built therein. In addition, the developing stations include an associated read-out optical system, positioned in the path followed by the film as it travels through the camera. Just after the film is developed, its image is projected through the optical system of the clearing stations and onto a display screen. This way, the operator may watch the images immediately after they are formed on the film. If the image is inferior, it is a simple matter to stop the machine and to recopy the image immediately.

The nature of a preferred embodiment of the invention will become more apparent from a study of the attached drawings, wherein.

Figures 1, 2:
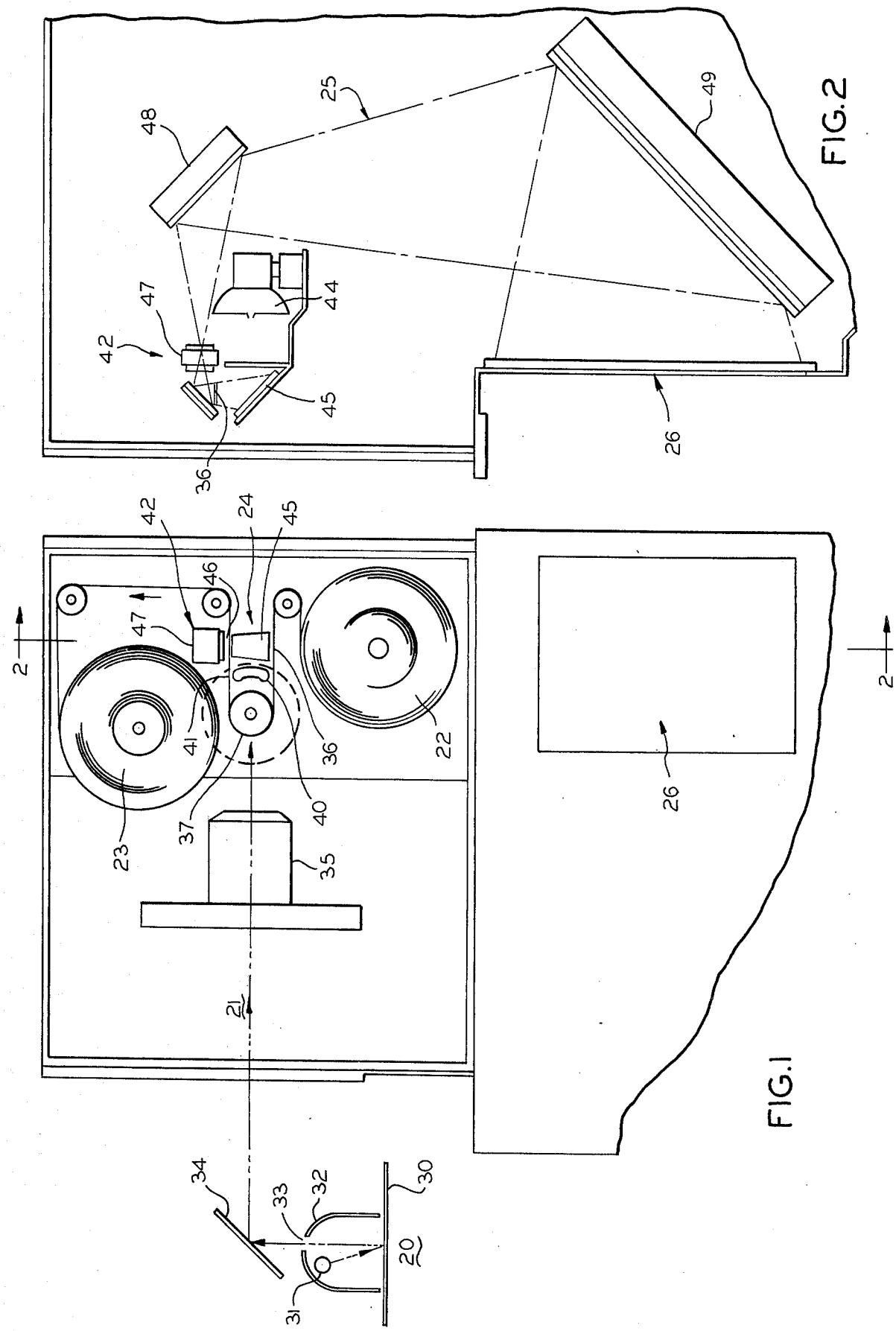
FIG. 1 is a schematic side view of the inventive microfilm camera.
FIG. 2 is a schematic view of the inventive camera, taken along line 2—2 of FIG. 1.

The principle portions of the inventive camera are a document feed area 20, an image optical path 21, a supply reel 22, a take-up reel 23, development stations 24, associated readout, secondary optical path 25, and an inspection station or viewing screen 26.

The document feed area 20 comprises a flat bed 30 for receiving a letter, blueprint, paper, photograph, or other similar material (herein collectively called "documents"). An ultraviolet light source 31 is positioned inside a reflector 32 having internal contours and highly reflective surfaces which concentrate light upon the document as it moves through the document feed area. Hence, the lighted image in the document feed area 20 is reflected through a slit 33 in the reflector 32 and along an image optical path 21, which includes a mirror 34 and a focusing lens 35. Hence, the image in the optical path is focused on the instant image film, here a vesicular film, 36 which feeds from supply reel 22 through a format area 37 to takeup reel 23.

The document in area 20 feeds through the copier in synchronism with the film 36. Therefore, the image copied onto the moving film 36 is a faithful reproduction of the document moving under the slit 33. The physical parameters are not too relevant to the invention; however, an exemplary system might, for example, copy the image of one typical document every 2 or 4 seconds. The document may travel under the slit 33 at a speed of 3 to 4 inches per second. The slit 33 may have a width in the order of one-half to three-quarters of an inch. The other parameters can be easily developed from these dimensions.

The light source 31 is primarily a source of ultraviolet light which generates a gas in the film 37. Therefore, the black areas in the document (e.g., print) do not reflect any appreciable amount of light, and no appreciable gas is generated in those parts of the film in the format area 37 which receive the image of these black areas. Conversely, the bright areas on the document (e.g., the white paper) do reflect a maximum amount of ultraviolet light, and a maximum amount of gas is generated from the corresponding parts of the film in the format area 37. In between black and white, shades of gray will cause release of measured amounts of gas to give varying photographic effects on the film.

Once the gas is generated, it is necessary to soften the plastic of the film so that bubbles or vesicles may form therein to produce an image on the film. When the film cools, the image sets. If the film is not heated within a short time after exposure to ultraviolet rays, the released gas merely escapes, the image fades, and the film loses its ability to take on an image.

For these reasons, a heating station 40 is positioned along the film path immediately after the format area 37. The heat thus sets the image formed at 37.

At this point, the area exposed to the ultraviolet light has been set or otherwise neutralized so that it is no longer affected by ultraviolet light. However, the compound remaining in the areas which did not receive ultraviolet light is still sensitive. Therefore, if the film is again exposed to ultraviolet light and heated, the image of the photocopy may deteriorate or be lost.

Accordingly, the next developing station 42 includes a secondary means for reading out the copied image and simultaneously desensitizing the compound remaining in the film, to thereby complete the neutralization of the film. This means is best seen in FIG. 2. Here, there is a secondary source 44 of ultraviolet light which is reflected on a mirror 45, through the film 46 in the secondary light path, a lens 47, and two additional mirrors 48, 49 to the viewing screen 26. Lens 47 focuses the image on the screen 26. Although the light from source 44 is "ultraviolet", it is not pure. Therefore, there is enough light in the visible range for the human eye to see the image focused on screen 26.

The light from source 44 strikes the entire film 46. It can have no effect upon the image of previously released gas which was set by the heat at station 40. However, it can activate and release the gas in the image areas where gas was not previously released at format area 37. Since there is no heating station adjacent the film path after it has left area 46, the newly released gas merely escapes from the film in time, without permanent effect upon the film. After this time, the film is stable and the image fixed for the life of the film.

An operator watches the inspection screen 26 and sees the quality of the image on the screen. Therefore, if a photocopy is defective, the operator knows immediately and can feed the document through the camera again. This way, a non-defective copy will appear on the film.

Those who are skilled in the art will readily perceive how various modifications may be made without departing from the scope and the spirit of the invention. Accordingly, the claims are to be construed to cover all equivalent structures.

I claim:

1. A microfilm camera for using a strip of instant image film, said camera comprising a film supply means, a take-up means, and means for causing said strip of film to travel over a path from said supply means to said take-up means, at least one instant developing station means disposed adjacent said film for developing across the entire width of the strip of film in the area adjacent said developing station, means comprising a read-out optical system positioned in the path followed by the film as it travels away from said developing station and through the camera to said takeup means, and desensitizing means for desensitizing the strip film thereof across the entire width in the area adjacent said desensitizing means and for simultaneously projecting the image which was instantly formed on the film through the read-out optical system and onto a display screen, whereby an operator may watch the images as they are formed on the film and recopy any defective image immediately after a defective image is found.

2. The camera of claim 1 wherein said developing station means comprises first means for exposing said film to an image illuminated by ultraviolet light, and means for thereafter heating said film to set said image.

3. A microfilm camera for using a instant image film, said camera comprising take-up means, at least one instant developing station means disposed adjacent said film, means comprising a read-out optical system positioned in the path followed by the film as it travels away from developing station and through the camera to said take-up means, second means for thereafter exposing said film to ambient ultraviolet light to release gas from image areas which did not receive light from said first means, means for projecting said ambient light through the image on the film and through the optical system and onto a display screen, whereby an operator may watch the images as they are formed on the film and recopy any defective image immediately after such a defective image is found, and means for transporting said film from said second means to said take-up means without exposing said film to a heat sufficient to set an image on said film.

4. The camera of claim 3 wherein the second means includes visible light which projects said image on said display screen.

5. The camera of claim 4 wherein said first means comprises a flat bed movable through a document feed area, reflector means containing an ultraviolet light source and having a light transmitting slit positioned over said feed area, means for moving said film in synchronism with the movement of said bed, and means for focusing the light emanating from said document on said film.

6. A method of maintaining the quality of document images as they are photocopied on a strip of microfilm comprising the steps of:
   a. providing a microfilm camera, which uses an instant image film, with an instant developing station built therein for developing the entirety width of said strip of the film adjacent the developing station;
   b. providing after the developing station an associated read-out optical system, positioned along a path which the film follows as it travels through the camera;
   c. projecting an image formed at said developing station as the film develops through a secondary optical system in said camera and onto a display screen, and
   d. stopping the camera if an inferior image is detected as it is formed on the film, and of recopying the image immediately, whereby all images are properly recorded on the microfilm.

7. The method of claim 6 and the added steps of setting an image after it is formed on the film and of thereafter completing a neutralization of the film.

8. The method of claim 7 and the added step of synchronizing movement of said film and of a document being copied whereby said photocopying may be a continuous process.

* * * * *